United States Patent
Matsumoto et al.

(10) Patent No.: US 10,831,515 B2
(45) Date of Patent: Nov. 10, 2020

(54) DETERMINATION APPARATUS AND DETERMINATION SYSTEM

(71) Applicant: NTT DOCOMO, INC., Tokyo (JP)

(72) Inventors: Nozomi Matsumoto, Tokyo (JP); Motoya Takahashi, Tokyo (JP); Sumin Kwak, Tokyo (JP); Tomoya Okumura, Tokyo (JP); Yuuki Fukuyoshi, Tokyo (JP)

(73) Assignee: NIT DOCOMO, INC., Tokyo (JP)

( * ) Notice: Subject to any disclaimer, the term of this patent is extended or adjusted under 35 U.S.C. 154(b) by 0 days.

(21) Appl. No.: 16/092,296

(22) PCT Filed: Apr. 18, 2017

(86) PCT No.: PCT/JP2017/015625
§ 371 (c)(1),
(2) Date: Oct. 9, 2018

(87) PCT Pub. No.: WO2017/195543
PCT Pub. Date: Nov. 16, 2017

(65) Prior Publication Data
US 2019/0129735 A1 May 2, 2019

(30) Foreign Application Priority Data
May 10, 2016 (JP) .................................. 2016-094590

(51) Int. Cl.
*G06F 3/048* (2013.01)
*G06F 9/451* (2018.01)
(Continued)

(52) U.S. Cl.
CPC ............ *G06F 9/453* (2018.02); *G06F 3/0481* (2013.01); *G06Q 10/06312* (2013.01);
(Continued)

(58) Field of Classification Search
CPC . G06F 9/453; G06F 3/0481; G06Q 10/06312; G06Q 20/145; G06Q 30/04;
(Continued)

(56) References Cited

U.S. PATENT DOCUMENTS 7,845,558 B2 * 12/2010 Beemer .............. G06Q 20/3276
235/462.01
8,719,602 B1 * 5/2014 Bilinski ................ G06F 1/3203
455/414.2
(Continued)

FOREIGN PATENT DOCUMENTS

| | | | |
|---|---|---|---|
| JP | 2006127372 A | 5/2006 | |
| JP | 2006251917 A | 9/2006 | |

(Continued)

OTHER PUBLICATIONS

International Search Report issued in corresponding PCT Application No. PCT/JP2017/015625 dated Jul. 18, 2017, 4 pages.
(Continued)

*Primary Examiner* — David Phantana-angkool
(74) *Attorney, Agent, or Firm* — MKG, LLC

(57) ABSTRACT

A user's proficiency level of operation of a user apparatus is determined with higher accuracy. Acquisition unit acquires service contract information of a user using the apparatus. Determination unit determines the user's proficiency level of operation of the user apparatus based on service contract information acquired by acquisition unit. Trigger determination unit determines whether or not there has been an event (called a "trigger") that triggers display of a hint to the user using the apparatus. If it is determined by trigger determination unit that a trigger has occurred, display control unit displays, on a display means, a hint corresponding to the trigger and the proficiency level determined by determination unit.

11 Claims, 11 Drawing Sheets

| CONTRACT SERVICE | PROFICIENCY LEVEL SCORE |
|---|---|
| REMOTE SUPPORT SERVICE | 1 |
| CLOUD STORAGE SERVICE | 3 |
| NAVIGATION SERVICE | 5 |

(51) Int. Cl.
    G06F 3/0481    (2013.01)
    G06Q 10/06     (2012.01)
    G06Q 30/04     (2012.01)
    H04M 11/00     (2006.01)
    G06Q 20/14     (2012.01)
    H04L 12/24     (2006.01)
    H04M 1/725     (2006.01)

(52) U.S. Cl.
    CPC ........... *G06Q 20/145* (2013.01); *G06Q 30/04* (2013.01); *H04L 41/5064* (2013.01); *H04M 1/72519* (2013.01); *H04M 11/00* (2013.01); *H04M 2250/56* (2013.01)

(58) Field of Classification Search
    CPC .......... H04L 41/5064; H04M 1/72519; H04M 11/00
    USPC ......................................................... 715/707
    See application file for complete search history.

(56) References Cited

U.S. PATENT DOCUMENTS

| | | | | |
|---|---|---|---|---|
| 8,870,791 | B2* | 10/2014 | Sabatino | A61B 7/00 381/67 |
| 10,042,689 | B2* | 8/2018 | Lee | G06F 11/0769 |
| 10,430,213 | B2* | 10/2019 | Won | G06F 9/453 |
| 2007/0281731 | A1* | 12/2007 | Attride | H04M 1/72563 455/550.1 |
| 2011/0125061 | A1* | 5/2011 | Shahar | A61B 5/205 600/586 |
| 2014/0172560 | A1* | 6/2014 | Satyavolu | H04M 15/8011 705/14.53 |
| 2016/0086222 | A1* | 3/2016 | Kurapati | G06Q 30/0261 705/14.53 |
| 2017/0053224 | A1* | 2/2017 | Duca | G06F 3/0481 |
| 2020/0257784 | A1* | 8/2020 | Brannon | G06F 21/6245 |

FOREIGN PATENT DOCUMENTS

| | | |
|---|---|---|
| JP | 2008204443 A | 9/2008 |
| JP | 2011221915 A | 11/2011 |
| WO | 01/01319 A1 | 4/2001 |
| WO | 2011/149688 A2 | 12/2011 |

OTHER PUBLICATIONS

Extended European Search Report issued in corresponding European Application No. 17795904.6 dated Mar. 28, 2019, 8 pages.
Office Action issued in corresponding Japanese Patent Application No. 2018-516910, dated Dec. 5, 2019, 7 pages.
Office Communication issued in corresponding European Patent Application No. 17795904.6, dated Jul. 9, 2020.

* cited by examiner

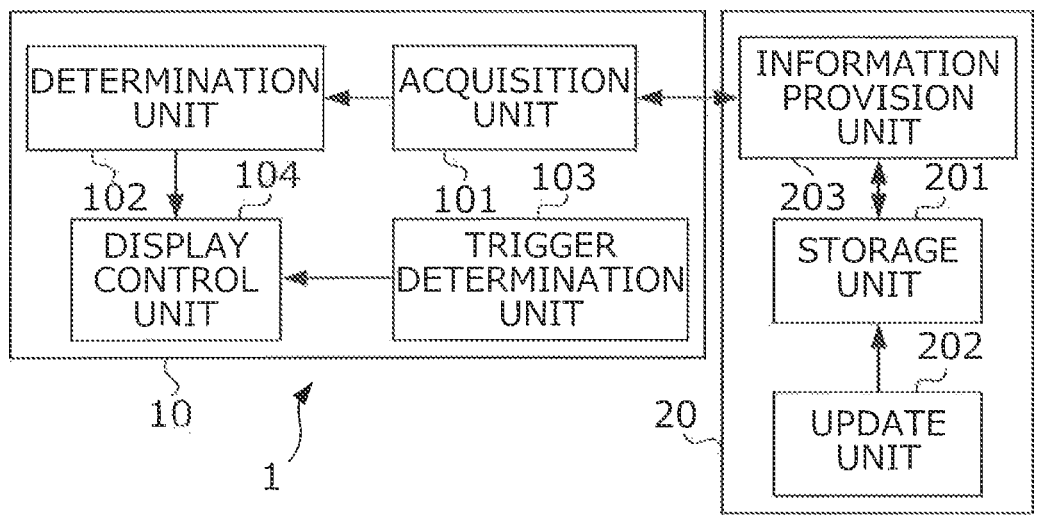

FIG. 4

| SERVICE NAME | USER ID | CONTRACT PERIOD | CONTRACT METHOD | CHANGE HISTORY |
|---|---|---|---|---|
| REMOTE SUPPORT SERVICE | ID001 | 2014.10.XX- | SHINJUKU STORE | NONE |
| | ID002 | 2014.11.XX-2015.12 | ONLINE | NONE |
| | ID003 | 2015.02.XX- | SHIBUYA STORE | NONE |
| | ... | ... | ... | ... |
| CLOUD STORAGE SERVICE | ID003 | 2015.04.XX- | ONLINE | 4GB EXPANSION |
| | ID015 | 2014.11.XX- | ONLINE | 2GB EXPANSION |
| | ID021 | 2015.01.XX- | SHINAGAWA STORE | NONE |
| | ... | ... | ... | ... |
| NAVIGATION SERVICE | ID007 | 2015.03.XX- | ONLINE | 3D DISPLAY |
| | ID021 | 2015.04.XX- | ONLINE | NONE |
| | ID036 | 2015.04.XX-2015.07.XX | ONLINE | 3D DISPLAY MULTI-LANGUAGE COMPATIBILITY |
| | ... | ... | ... | ... |

FIG. 5

| CONTRACT SERVICE | PROFICIENCY LEVEL SCORE |
|---|---|
| REMOTE SUPPORT SERVICE | 1 |
| CLOUD STORAGE SERVICE | 3 |
| NAVIGATION SERVICE | 5 |

FIG. 6A

| CONTRACT TIME | PROFICIENCY LEVEL SCORE |
|---|---|
| 2016.01.01 OR LATER | 1 |
| 2014.01.01 OR LATER, 2015.12.31 OR EARLIER | 2 |
| 2013.12.31 OR EARLIER | 3 |

FIG. 6B

| CONTRACT METHOD | PROFICIENCY LEVEL SCORE |
|---|---|
| IN-STORE | 1 |
| ONLINE | 3 |

FIG. 6C

| CHANGE HISTORY | PROFICIENCY LEVEL SCORE |
|---|---|
| NONE | 0 |
| ONCE | 1 |
| TWICE OR MORE | 2 |

FIG. 6D

| PROFICIENCY LEVEL SCORE | PROFICIENCY LEVEL |
|---|---|
| LESS THAN 5 | BEGINNER |
| 5 OR MORE, LESS THAN 10 | INTERMEDIATE |
| 10 OR MORE | ADVANCED |

FIG. 7

| TRIGGER | PROFICIENCY LEVEL | HINT |
|---|---|---|
| STARTUP OF TRANSLATION APPLICATION A | BEGINNER | HOW TO USE BASIC FUNCTION |
| | INTERMEDIATE | HOW TO USE EXPANDED FUNCTION |
| | ADVANCED | DICTIONARY CUSTOMIZATION METHOD |
| DISPLAY OF ERROR CODE B | BEGINNER | RESTARTING METHOD |
| | INTERMEDIATE | OPERATION METHOD FOR RESOLVING ERROR |
| | ADVANCED | METHOD FOR FINDING CAUSE OF ERROR |
| . . . | . . . | . . . |

| USER ID | BILLING DATE/TIME | BILLING AMOUNT (YEN) |
|---|---|---|
| ID001 | 2016.01.10 13:XX | 1500 |
| | 2016.02.20 19:XX | 2000 |
| | 2016.04.05 10:XX | 1000 |
| | ... | ... |
| ID002 | 2016.01.15 20:XX | 300 |
| | 2016.01.15 21:XX | 500 |
| | 2016.01.15 23:XX | 400 |
| | ... | ... |
| ... | ... | ... |

| BILLING UNIT PRICE | PROFICIENCY LEVEL SCORE |
|---|---|
| LESS THAN THRESHOLD TH11 | 1 |
| GREATER THAN OR EQUAL TO THRESHOLD TH11, LESS THAN TH12 | 3 |
| GREATER THAN OR EQUAL TO THRESHOLD TH12 | 5 |

| BILLING FREQUENCY | PROFICIENCY LEVEL SCORE |
|---|---|
| LESS THAN THRESHOLD TH21 | 1 |
| GREATER THAN OR EQUAL TO THRESHOLD TH21, LESS THAN TH22 | 3 |
| GREATER THAN OR EQUAL TO THRESHOLD TH22 | 5 |

FIG. 13B

| PROFICIENCY LEVEL SCORE | PROFICIENCY LEVEL |
|---|---|
| LESS THAN 3 | BEGINNER |
| 3 OR MORE, LESS THAN 6 | INTERMEDIATE |
| 6 OR MORE | ADVANCED |

FIG. 14

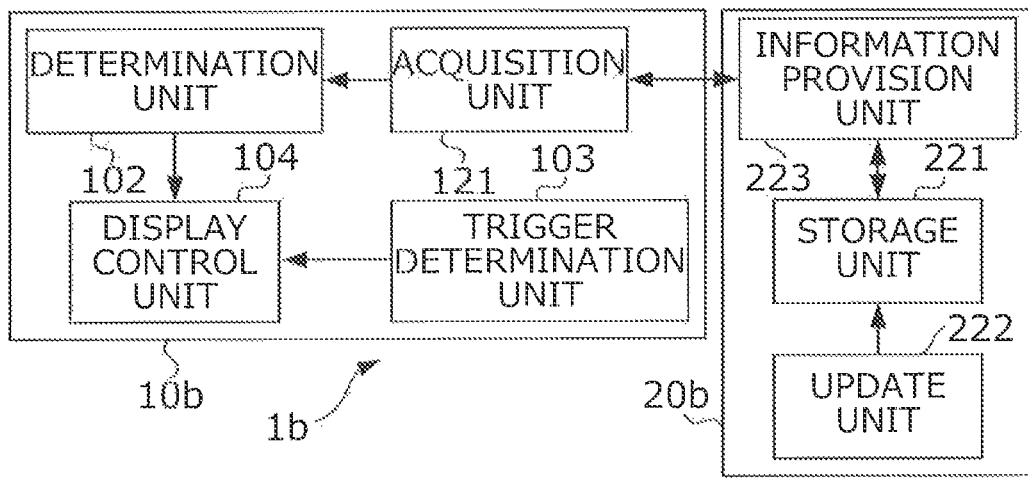

FIG. 15

| USER ID | USED MODEL | STORAGE CAPACITY | USAGE PERIOD |
|---|---|---|---|
| ID001 | A CORP. LOW1 | 16GB | 2014.01-2015.12 |
| | B CORP. MID1 | 32GB | 2016.01- |
| ID002 | A CORP. MID2 | 64GB | 2012.04-2013.12 |
| | A CORP. HIGH1 | 128GB | 2013.01-2015.12 |
| | C CORP. HIGH1 | 256GB | 2015.09- |
| | A CORP. HIGH2 | 128GB | 2016.01- |
| ... | ... | ... | ... |

FIG. 16

| USAGE PERIOD | PROFICIENCY LEVEL SCORE |
|---|---|
| LESS THAN 1 YEAR | 1 |
| 1 YEAR OR MORE, LESS THAN 3 YEARS | 3 |
| 3 YEARS OR MORE | 5 |

FIG. 17A

| SIMULTANEOUSLY-USED APPARATUS COUNT | PROFICIENCY LEVEL SCORE |
|---|---|
| 1 | 1 |
| 2 | 3 |
| 3 OR MORE | 5 |

FIG. 17B

| APPARATUS PERFORMANCE (STORAGE CAPACITY) | PROFICIENCY LEVEL SCORE |
|---|---|
| LESS THAN 32 GB | 1 |
| 32 GB OR MORE, LESS THAN 128 GB | 3 |
| 128 GB OR MORE | 5 |

FIG. 17C

| APPARATUS MODEL | PROFICIENCY LEVEL SCORE |
|---|---|
| LOW END | 1 |
| MIDDLE RANGE | 3 |
| HIGH END | 5 |

FIG. 17D

| PROFICIENCY LEVEL SCORE | PROFICIENCY LEVEL |
|---|---|
| LESS THAN 10 | BEGINNER |
| 10 OR MORE, LESS THAN 15 | INTERMEDIATE |
| 15 OR MORE | ADVANCED |

FIG. 18

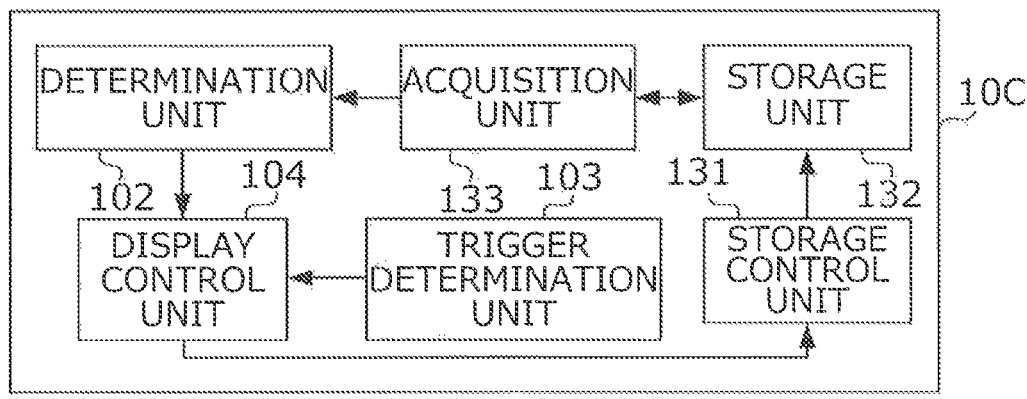

FIG. 19

| OPERATION HISTORY || HINT |
| --- | --- | --- |
| OPERATION CONTENT | OPERATION TIME | |
| OPERATION OF SELECTING ITEM E | 19:00 | OPERATION PROCEDURE FOR INITIAL SETTING OF APPLICATION D |
| OPERATION OF SETTING PARAMETER F | 19:02 | |
| ... | ... | |
| OPERATION OF COMPLETING INITIAL SETTING | 20:00 | |

FIG. 20

| MATCHING DEGREE OF OPERATION CONTENT | PROFICIENCY LEVEL SCORE |
| --- | --- |
| LESS THAN 70% | 1 |
| 70% OR MORE, LESS THAN 90% | 3 |
| 90% OR MORE | 5 |

FIG. 21A

| OPERATION TIME | PROFICIENCY LEVEL SCORE |
| --- | --- |
| STANDARD TIME × LESS THAN 0.5 | 5 |
| STANDARD TIME × 0.5 OR MORE, STANDARD TIME × LESS THAN 1.5 | 3 |
| STANDARD TIME × 1.5 OR MORE | 1 |

FIG. 21B

| PROFICIENCY LEVEL SCORE | PROFICIENCY LEVEL |
|---|---|
| LESS THAN 5 | BEGINNER |
| 5 OR MORE, LESS THAN 8 | INTERMEDIATE |
| 8 OR MORE | ADVANCED |
*FIG. 22*
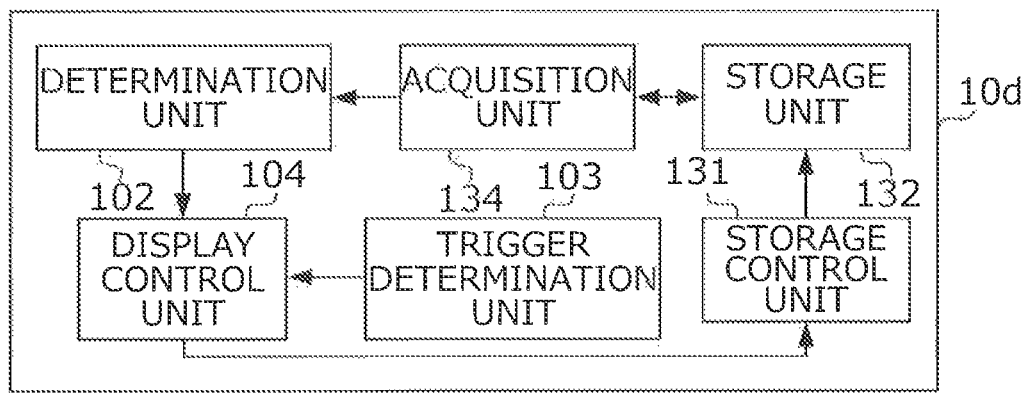
*FIG. 23*
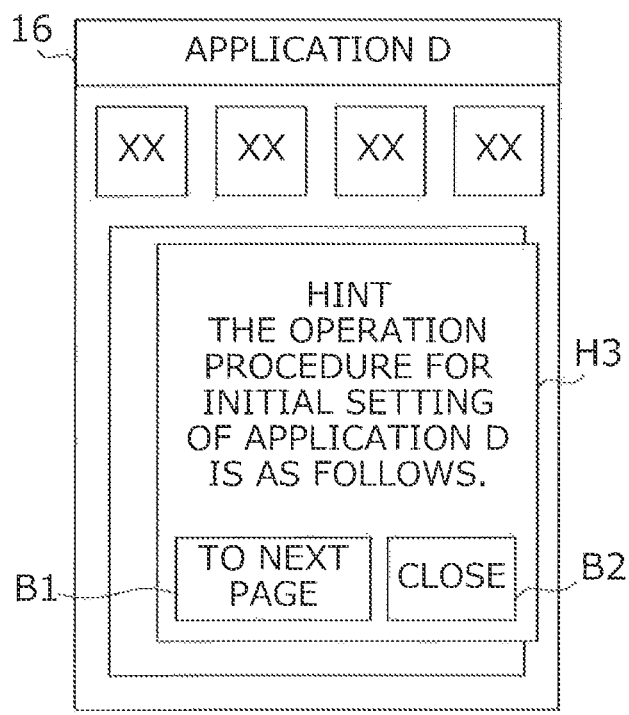
*FIG. 24*

| HINT TYPE | PROFICIENCY LEVEL SCORE |
|---|---|
| EXPLANATION OF INITIAL SETTING AND STANDARD FUNCTION | 1 |
| EXPLANATION OF ADDITIONAL FUNCTION | 3 |
| EXPLANATION OF CUSTOMIZATION METHOD | 5 |
FIG. 25
| CONTRACT TIME | PROFICIENCY LEVEL SCORE |
|---|---|
| ONE MONTH FROM THE START OF SALE OF USER APPARATUS | 0 |
| OTHER | 2 |
FIG. 26
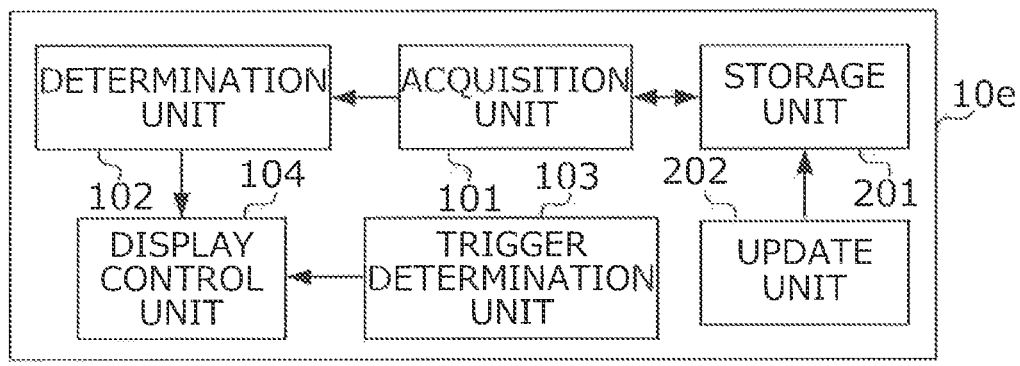
FIG. 27A
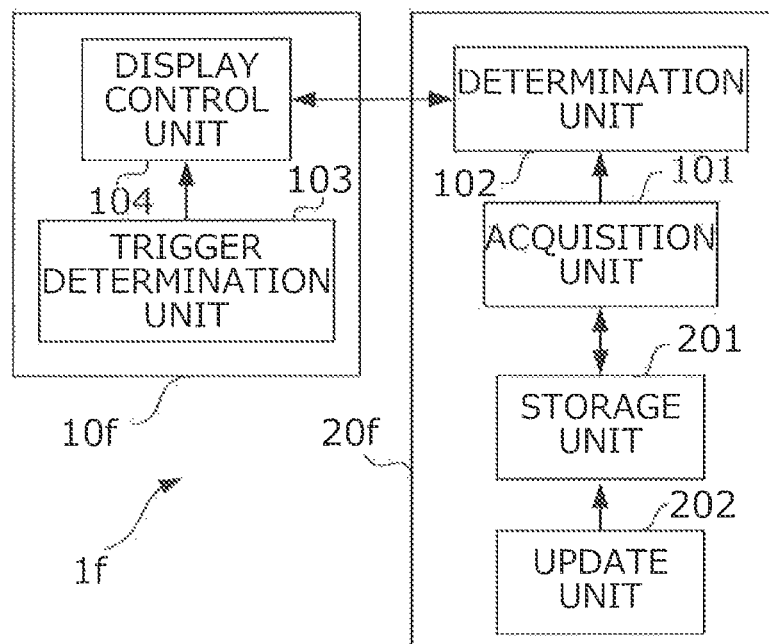
FIG. 27B

DETERMINATION APPARATUS AND DETERMINATION SYSTEM

TECHNICAL FIELD

The present invention relates to a technique for determining a proficiency level of operation of a user apparatus.

BACKGROUND ART

A technique for determining a proficiency level of operation of a user apparatus is known. For example, JP 2006-127372A discloses a technique in which a degree to which a user proficiently uses a device (proficiency level) is estimated based on personal information of a user (sex, age, favorite color, favorite character, etc.) or the like.

SUMMARY

If a user's proficiency level of operation of a user apparatus is acquired, for example, a hint explaining a simple operation method is displayed if the user has a low proficiency level, or a hint explaining an advanced operation method is displayed if the user has a high proficiency level, and in this manner, the technique can be used such that information that is likely to be useful to the user is presented. For this reason, it is desirable that the proficiency level of the user is acquired with a high accuracy.

In view of this, an object of the present invention is to determine a user's proficiency level of operation of a user apparatus with higher accuracy.

In order to achieve the above-described object, the present invention provides a determination apparatus including: an acquisition unit configured to acquire information indicating a usage status of a user apparatus of a user; and a determination unit configured to determine a proficiency level of operation of the user apparatus of the user based on the acquired information indicating the usage status.

Also, the acquisition unit may acquire information relating to a contract for a service used by operating the user apparatus, as the information indicating the usage status.

Furthermore, the acquisition unit may acquire a time at which the service is contracted, a method for entering the contract for the service, or information indicating whether or not content of the service has been changed, as the information relating to the contract.

Also, the acquisition unit may acquire information relating to billing of a paid service used by operating the user apparatus, as the information indicating the usage status.

Furthermore, the acquisition unit may acquire information indicating a billing unit price for the paid service or a billing frequency for the paid service, as the information relating to billing.

Also, the user apparatus may include a user apparatus belonging to a first group, and another user apparatus belonging to a second group that has more functions than the user apparatus belonging to the first group, and the acquisition unit may acquire information relating to the other user apparatus that has been used by the user, as the information indicating the usage status.

Furthermore, the acquisition unit may acquire information on a period in during which the user has used the other user apparatus in the past, a number of the other user apparatus that is used by the user, a performance of the other user apparatus that is used by the user, or a model of the other user apparatus that is used by the user, as the information indicating the usage status.

Also, the user apparatus may have a function of displaying usage method information indicating a method of using the user apparatus, and the acquisition unit may acquire a history of operations performed by the user while the usage method information is displayed, as the information indicating the usage status.

Furthermore, the user apparatus may have a function of displaying multiple pieces of usage method information indicating methods of using the user apparatus, and from among the multiple pieces of usage method information, the acquisition unit may acquire information specifying usage method information displayed when the user performs a specific operation, as the information indicating the usage status.

Also, the present invention provides a determination system including: an acquisition unit configured to acquire information indicating a usage status of a user apparatus of a user; and a determination unit configured to determine a proficiency level of operation of the user apparatus of the user based on the acquired information indicating the usage status.

According to the present invention, it is possible to determine a user's proficiency level of operation of a user apparatus with higher accuracy.

BRIEF DESCRIPTION OF DRAWINGS

FIG. 4 is a diagram showing a functional configuration realized by an information processing system.

FIG. 5 is a diagram showing an example of stored service contract information.

FIG. 6A is a diagram showing an example of a proficiency level score table.

FIG. 6B is a diagram showing an example of a proficiency level score table.

FIG. 6C is a diagram showing an example of a proficiency level score table.

FIG. 6D is a diagram showing an example of a proficiency level score table.

FIG. 7 is a diagram showing an example of a proficiency level table.

FIG. 13B is a diagram showing an example of a proficiency level score table.

FIG. 14 is a diagram showing an example of a proficiency level table.

FIG. 15 is a diagram showing a functional configuration realized by an information processing system according to a third embodiment.

FIG. 16 is a diagram showing an example of stored multi-function apparatus information.

FIG. 17A is a diagram showing an example of a proficiency level score table.

FIG. 17B is a diagram showing an example of a proficiency level score table.

FIG. 17C is a diagram showing an example of a proficiency level score table.

FIG. 17D is a diagram showing an example of a proficiency level score table.

FIG. 18 is a diagram showing an example of a proficiency level table.

FIG. 19 is a diagram showing a functional configuration realized by a smartphone according to a modified example.

FIG. 20 is a diagram showing an example of a stored operation history and hint.

FIG. 21A is a diagram showing an example of a proficiency level score table.

FIG. 21B is a diagram showing an example of a proficiency level score table.

FIG. 22 is a diagram showing an example of a proficiency level table.

FIG. 23 is a diagram showing a functional configuration realized by a smartphone according to a modified example.

FIG. 24 is a diagram showing an example of a specific operation.

FIG. 25 is a diagram showing an example of a proficiency level score table.

FIG. 26 is a diagram showing an example of a proficiency level score table in a modified example.

FIG. 27A is a diagram showing an example of a functional configuration in a modified example.

FIG. 27B is a diagram showing an example of a functional configuration in a modified example.

DETAILED DESCRIPTION

First Embodiment

Figure 1:
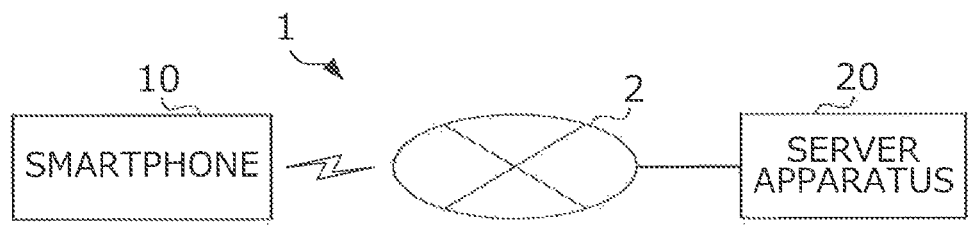
FIG. 1 is a drawing showing an overall configuration of an information processing system according to a first embodiment.

FIG. 1 is a drawing showing an overall configuration of information processing system 1 according to a first embodiment. Information processing system 1 is a system for making it possible to comfortably use a user apparatus such as a smartphone by providing a user using the user apparatus with hints corresponding to the user's proficiency level (e.g., indicated as beginner, intermediate, and advanced) of operation of the user apparatus. A hint in this context is information indicating how to use the user apparatus, and for example, a hint is information indicating a method for performing an operation on a screen currently being displayed, information indicating a method for performing restoration from an error that has occurred on the user apparatus, or the like.

Information management system 1 includes network 2, smartphone 10, and server apparatus 20. Network 2 includes a mobile communication network, Internet, or the like, and mediates data exchange between apparatuses. Smartphone 10 is connected to network 2 through mobile communication, and server apparatus 20 is connected to network 2 with a wire (or wirelessly).

Smartphone 10 is a user apparatus used by a user. Smartphone 10 includes a function of determining the above-mentioned user's proficiency level of operation of the user apparatus, and a function of displaying information corresponding to the determined proficiency level. Hereinafter, when "proficiency level" or "proficiency level of operation" is simply mentioned, it is assumed to mean the user's proficiency level of operation of the user apparatus. Smartphone 10 determines the proficiency level based on information stored in server apparatus 20. Server apparatus 20 is an information processing apparatus that stores information to be used in the determination of the proficiency level. This information will be described in detail later.

Figure 2:
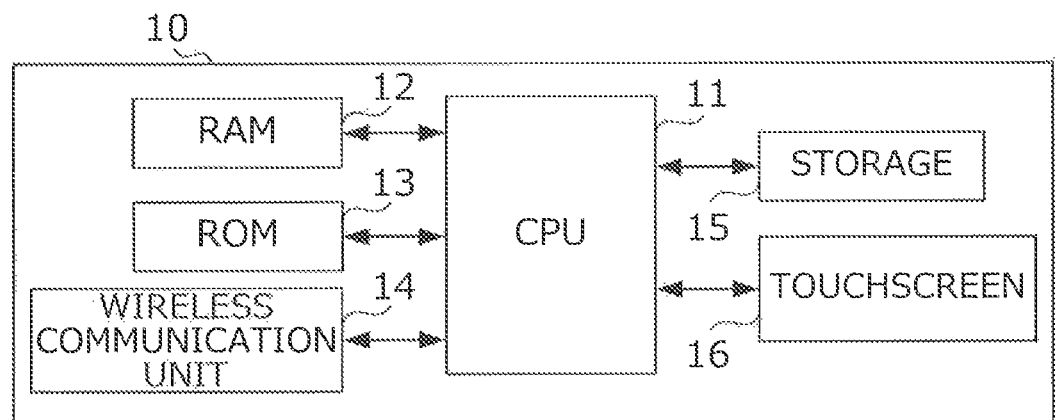
FIG. 2 is a diagram showing a hardware configuration of a smartphone.

FIG. 2 shows a hardware configuration of smartphone 10. Smartphone 10 is a computer that includes CPU (Central Processing Unit) 11, RAM (Random Access Memory) 12, ROM (Read Only Memory) 13, wireless communication unit 14, storage 15, and touchscreen 16.

CPU 11 controls the operation of the units by executing programs stored in ROM 13 or storage 15 using RAM 12 as a work area. Wireless communication unit 14 has a communication circuit that performs wireless communication conforming to mobile communication and wireless communication conforming to a wireless LAN (Local Area Network), and performs communication with an external apparatus via network 2. Storage 15 is a storage means such as a flash memory, and stores data and programs to be used by CPU 11 for control. Touchscreen 16 includes a display, which is a display means of smartphone 10, and a touch panel provided on the surface of the display, and touchscreen 16 displays an image and receives operations from a user.

Figure 3:
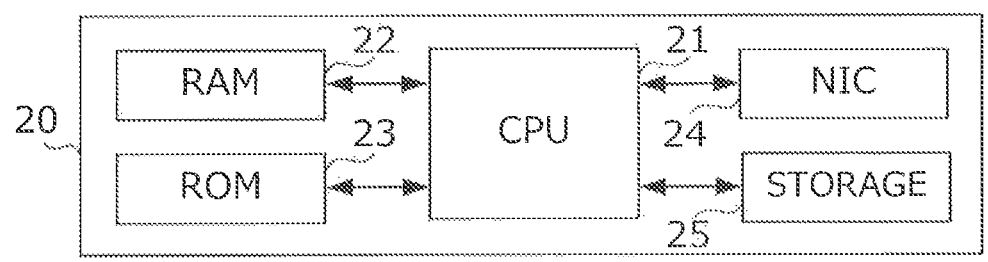
FIG. 3 is a diagram showing a hardware configuration of a server apparatus.

FIG. 3 shows a hardware configuration of server apparatus 20. Server apparatus 20 is a computer including CPU 21, RAM 22, ROM 23, NIC (Network Interface Card) 24, and storage 25. CPU 21, RAM 22, and ROM 23 are hardware that is the same as the hardware with the same name shown in FIG. 2. NIC 24 includes a circuit for communicating with network 2 through a wire (or wirelessly) and communicates with, for example, smartphone 10 via network 2. Storage 25 is a storage means such as an HDD (Hard Disk Drive) or SSD (Solid State Drive), and stores data and programs to be used by the CPU 21 for control.

The functions described hereinafter are realized by the CPUs of the apparatuses included in information processing system 1 executing the programs and controlling the units.

FIG. 4 shows a functional configuration realized by information processing system 1. Smartphone 10 includes acquisition unit 101, determination unit 102, trigger determination unit 103, and display control unit 104. Server apparatus 20 includes storage unit 201, update unit 202, and information provision unit 203.

Storage unit 201 of server apparatus 20 stores service contract information, which is information relating to the contract for the service that is used by the user operating smartphone 10. In the present embodiment, as the service used by the user, a remote support service for asking an operator at a call center how to use the smartphone, a cloud storage service for storing the user's data in a storage region ensured in a cloud system, and a navigation service for providing a car navigation function for instructing guidance of a route of a car, switching of a screen, playback of music, and the like through voice.

FIG. 5 shows an example of stored service contract information. In the example of FIG. 5, storage unit 201 stores a "user ID", a "contract period", a "contract method", and a "change history" in association with each other for each of a "remote support service", a "cloud storage service", and a "navigation service". For example, storage unit 201 stores the user ID "ID001" of the user using the remote support service, the contract period "2014.10.xx-" (-without end indicates that the contract is still in effect), the contract method "Shinjuku store" (indicates that the contract is entered at the store with that name), and the change history "none" (indicates that there have been no changes since the start of the contract) in association with each other.

Also, storage unit 201 stores the user ID "ID036" of the user using the navigation service, the contract period "2015.04.xx-2015.07.xx" (indicates that the contract ended on 2015.07.xx), the contract method "online" (indicates that the contract is entered by inputting predetermined items on a webpage for making a contract), and the two change histories "3D display" and "multiple language compatibility" in association with each other.

In the present embodiment, as these user IDs, identification information is used which is not allocated in the service systems for managing the service contracts, but is allocated in order to identify the user using information processing system 1. That is, the same user ID is allocated to the same person. A user ID table in which the user IDs of the present system and the user IDs of the service systems are associated is stored in server apparatus 20. Note that if a user ID that is used in common is used in the systems for managing the service contracts, that user ID may be used in information processing system 1 as well.

Update unit 202 of server apparatus 20 updates the service contract information stored in storage unit 201. Update unit 202 periodically requests service contract information of the users from the service systems, for example. Update unit 202 acquires service contract information that is transmitted in response to the request, and if there is a difference (a change in the contract content) between the service contract information and the service contract information stored in storage unit 201, update unit 202 updates the stored service contract information by applying the difference thereto.

Acquisition unit 101 of smartphone 10 acquires the service contract information of the user using smartphone 10. The service contract information is an example of information indicating the usage status of the user apparatus (smartphone 10 in the present embodiment) of the user in the present invention, and acquisition unit 101 is an example of an "acquisition unit" of the present invention. Usage of the user apparatus in this context encompasses not only operation of the user apparatus, but also using a service by operating the user apparatus. The user ID of the user using smartphone 10 is stored in smartphone 10 during user registration of information processing system 1, for example. Acquisition unit 101 transmits, to server apparatus 20, request data for requesting the service contract information of the user identified by the user ID stored in smartphone 10.

Information provision unit 203 of server apparatus 20 provides the service contract information requested by the user apparatus to that user apparatus. When the above-mentioned request data is transmitted from acquisition unit 101 of smartphone 10, for example, information provision unit 203 reads out the service contract information stored in association with the user ID indicated by the request data, from storage unit 201.

Information provision unit 203 provides the requested service contract information by transmitting the read-out service contract information to smartphone 10, which is the transmission source of the request data. Acquisition unit 101 acquires the service contract information transmitted from server apparatus 20 in response to the request data. Specifically, acquisition unit 101 acquires the pieces of information shown in FIG. 5, that is, service contract information including the contract time indicating the time at which the service is contracted, the contract method for the service, and the change history indicating whether or not the content of the service has been changed. Acquisition unit 101 supplies the acquired service contract information to determination unit 102.

Determination unit 102 of smartphone 10 determines the user's proficiency level of operation of the user apparatus based on the service contract information acquired by acquisition unit 101. Determination unit 102 is an example of a "determination unit" of the present invention, and CPU 11 of smartphone 10, which realizes determination unit 102, is an example of a "determination apparatus" of the present invention. Determination unit 102 stores a proficiency level score table in which the service contract information and scores indicating proficiency levels are associated, and a proficiency level table in which the proficiency level scores and the proficiency levels (in this embodiment, beginner, intermediate, and advanced) are associated, and determines the proficiency level using these tables.

FIGS. 6A to 6D show examples of proficiency level score tables. In the example shown in FIG. 6A, the proficiency level scores "1", "3", and "5" are respectively associated with the contract services "remote support service", "cloud storage service", and "navigation service". In the example of FIG. 6B, the proficiency level scores "1", "2", and "3" are respectively associated with the contract times "2016.01.01 or later", "2014.01.01 or later, 2015.12.31 or earlier", and "2013.12.31 or earlier". The contract time means the time at which the contract date is included.

In the example of FIG. 6C, the proficiency level scores "1" and "3" are respectively associated with the contract methods "in-store" and "online". In the example of FIG. 6D, the proficiency level scores "0", "1", and "2" are respectively associated with the change histories "none", "once", and "twice or more". Determination unit 102 reads out the scores associated in these proficiency level score tables with the contract time, contract method, and change history included in the service contract information supplied from acquisition unit 101, and adds up the read-out scores.

For example, in the service contract information of the user of "ID001" shown in FIG. 5, the contract service is "remote support service", the contract date is "2014.10.xx", the contract method is "Shinjuku store", and the change history is "none", and therefore determination unit 102 adds "1", which is associated with the "remote support service", "2", which is associated with "2014.01.01-2015.12.31", "1", which is associated with the contract method "in-store", and "0", which is associated with the change history "none", to obtain "4", which is calculated as the score indicating the user's proficiency level.

The user of "ID003" shown in FIG. 5 uses the "remote support service" and the "cloud storage service". In this case, in the present embodiment, determination unit 102 further adds the scores ("4" and "9" respectively) calculated based on the respective pieces of service contract information to obtain the score "13" (4+9=13), which is calculated as the score indicating the user's proficiency level.

FIG. 7 shows an example of a proficiency level table. In the example of FIG. 7, the proficiency levels "beginner", "intermediate", and "advanced" are respectively associated with the proficiency level scores "less than 5", "5 or more, less than 10", and "10 or more". Determination unit 102 determines the proficiency level associated in the proficiency level table with the proficiency level score calculated as described above, as the proficiency level of the user using the smartphone 10. Since "4" has been calculated as the score indicating the user proficiency level for the user of "ID001" described above for example, determination unit 102 determines "beginner", which is associated with "less than 5", as the user's proficiency level. Also, since "13" has been calculated as the score indicating the user proficiency level for the user of "ID003", determination unit 102 determines "advanced", which is associated with "10 or more", as the user's proficiency level.

Determination unit 102 performs the above-described determination at, for example, a determined timing (every day, every week, or the like), when the user performs an operation for instructing determination of the proficiency level, or the like. Acquisition unit 101 acquires the service contract information at the timing at which determination unit 102 determines the proficiency level, for example. Note that acquisition unit 101 may also acquire the service contract information at a different timing (e.g., periodically, with a higher frequency than the determination of the proficiency level). Determination unit 102 supplies the thus-determined proficiency level to display control unit 104.

Trigger determination unit 103 of smartphone 10 determines whether or not an event (called a "trigger") that triggers display of a hint to the user using smartphone 10 has occurred. For example, startup of a specific application program, the occurrence of a specific error, display of a specific webpage, a performance of a specific operation, or the like is used as the trigger. Trigger determination unit 103 stores the types of processing corresponding to the triggers.

The processing corresponding to the triggers is, for example, processing for starting up a specific application, processing for displaying an error code of a specific error, processing for displaying a specific web page, processing for generating operation data indicating a specific operation, and the like. When these processes are performed by smartphone 10, trigger determination unit 103 determines that the corresponding triggers have occurred. Trigger determination unit 103 periodically determines whether or not the triggers have occurred, and if it is determined that any of the triggers has occurred, trigger determination unit 103 supplies trigger information indicating the trigger that occurred to display control unit 104.

If the occurrence of a trigger is determined by trigger determination unit 103, display control unit 104 of smartphone 10 displays a hint corresponding to the trigger and the proficiency level determined by determination unit 102 on the display means. The hint displayed by display control unit 104 is information indicating how to use the above-described user apparatus, and is an example of "usage method information" of the present invention. Due to display control unit 104 and the display means cooperating, a function of displaying the usage method information is realized. Display control unit 104 stores a hint table in which the triggers, proficiency levels, and hints are associated, and display control unit 104 performs hint display control using the hint table.

Figures 8, 9A:
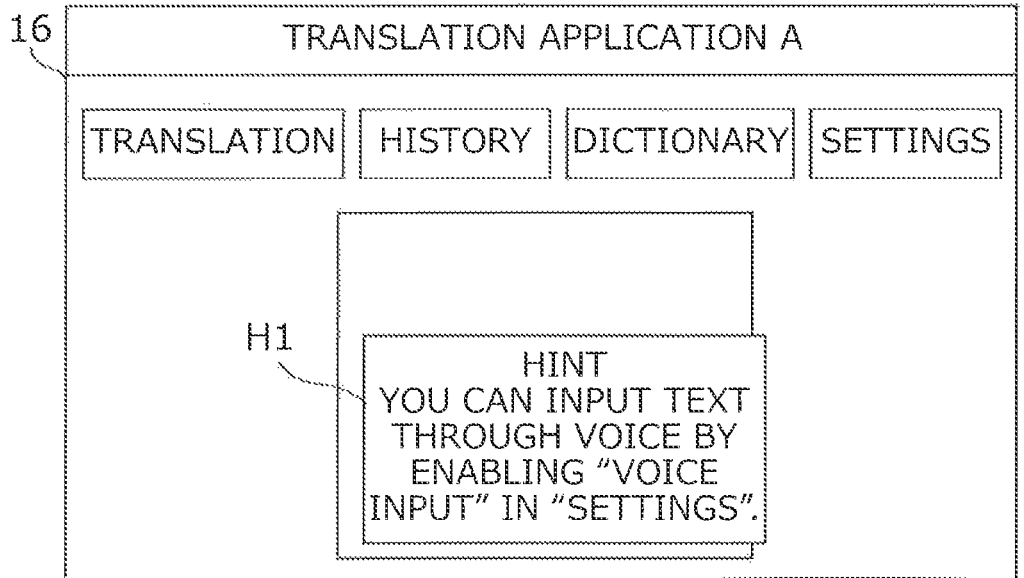
FIG. 8 is a diagram showing an example of a hint table.
FIG. 9A is a diagram showing an example of a displayed hint.

FIG. 8 shows an example of a hint table. In the example of FIG. 8, the set composed of the proficiency level "beginner" and the hint "how to use basic function", the set composed of the proficiency level "intermediate" and the hint "how to use expanded function", and the set composed of the proficiency level "advanced" and the hint "dictionary customization method" are associated with the trigger "startup of translation application A". Also, the set composed of the proficiency level "beginner" and the hint "restarting method", the set composed of the proficiency level "intermediate" and the hint "operation method for resolving error", and the set composed of the proficiency level "advanced" and the hint "method for finding cause of error" are associated with the trigger "display of error code B".

When the trigger information is supplied from trigger determination unit 103, display control unit 104 reads out the hint associated with the trigger indicated by the supplied trigger information and the proficiency level supplied from determination unit 102. If the trigger "startup of translation application A" for example is supplied from trigger determination unit 103 and the proficiency level "intermediate" has been supplied from determination unit 102, display control unit 104 displays the hint "how to use expanded function", which is associated with the trigger and proficiency level in the hint table.

Figures 9B, 10:
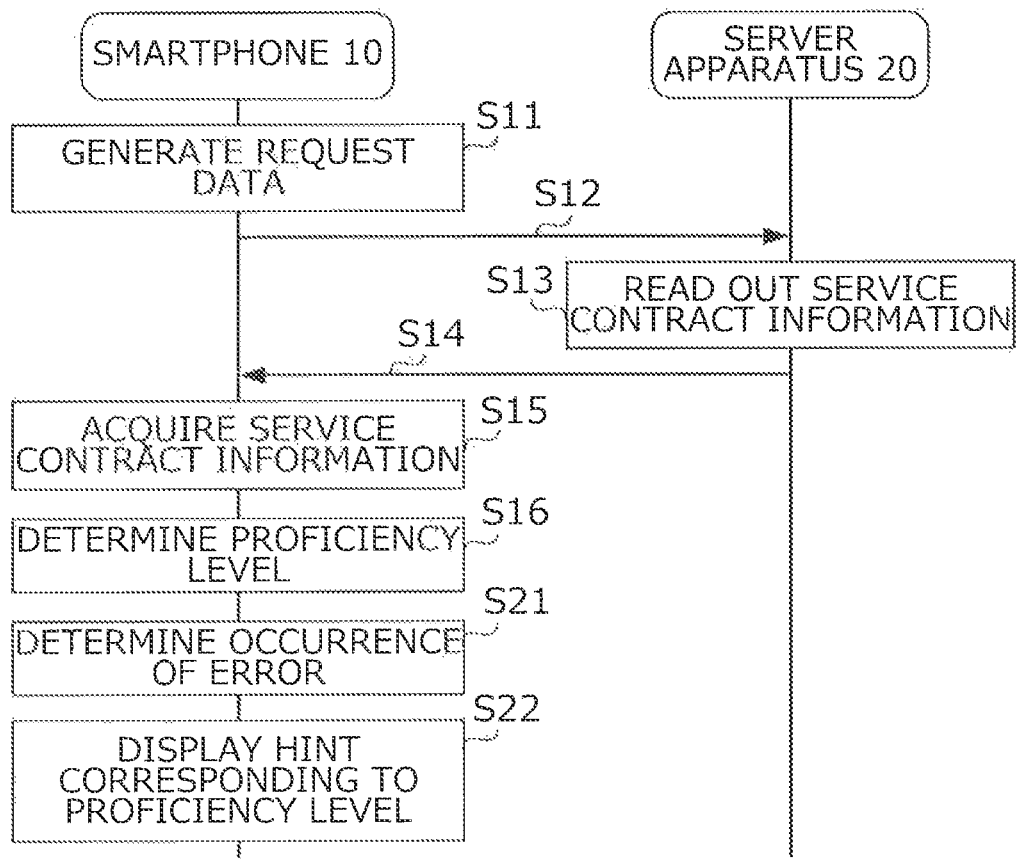
FIG. 9B is a diagram showing an example of a displayed hint.
FIG. 10 is a diagram showing an example of an operation procedure of apparatuses for determination processing and display processing.

FIGS. 9A and 9B show examples of hints that are displayed. In the example of FIG. 9A, if the user is determined as "intermediate", display control unit 104 displays "hint" and a hint H1 saying "You can input text through voice by enabling 'voice input' in 'settings'." on touchscreen 16 (display means in the present embodiment) on which the screen "translation application A" is displayed. Hint H1 is the hint stored as "how to use expanded settings", which is associated with "intermediate" in the hint table.

In the example of FIG. 9B, if the user is determined as "advanced", display control unit 104 displays "hint" and hint H2 saying "You can register words by selecting 'word registration' from 'dictionary'." on touchscreen 16. Hint H2 is the hint stored as "dictionary customization method", which is associated with "advanced" in the hint table. In information processing system 1, hints corresponding to the proficiency level of the user are thus displayed on the user apparatus (in this embodiment, smartphone 10) used by the user.

Based on the above-described configuration, the apparatuses included in information processing system 1 perform determination processing for determining the proficiency level and display processing for displaying a hint.

FIG. 10 indicates an example of an operation procedure of apparatuses for determination processing and display processing. In the example shown in FIG. 10, the operation procedure is started upon reaching the timing at which determination unit 102 determines the proficiency level. First, smartphone 10 (acquisition unit 101) generates request data for requesting acquisition of the service contract information of the user using smartphone 10 (step S11), and smartphone 10 transmits the generated acquisition data to server apparatus 20 (step S12).

Upon receiving the request data in step S12, server apparatus 20 (information provision unit 203) reads out the service contract information of the user indicated by the request data (step S13) and transmits the read-out service contract information to smartphone 10, which is the request source (step S14). Smartphone 10 (acquisition unit 101) acquires the service contract information transmitted in step S14 (step S15).

Next, smartphone 10 (determination unit 102) determines the proficiency level of operation of the user apparatus of the user using smartphone 10 based on the acquired service contract information (step S16). Steps S11 to S16 are an operation procedure for determination processing. In the example of FIG. 10, in step S16 and onward, it is assumed that smartphone 10 (trigger determination unit 103) has determined that a trigger of smartphone 10 has occurred (step S21). In this case, smartphone 10 (display control unit 104) displays a hint corresponding to the type of trigger that has occurred and the determined proficiency level on touchscreen 16, which is a display means (step S22).

In the present embodiment, the proficiency level of operation is determined based on the service contract information of the service used by the user. The service contract information is an example of information indicating the usage status of the user apparatus, and the proficiency level score calculated based on the service contract information is obtained as a result of analyzing the usage status of the user apparatus. According to the present embodiment, the result of analyzing the usage status can be applied to the proficiency level determination processing.

In the above-described example, for example, beginners, who are not familiar with the operation method of the user apparatus (in the present embodiment, smartphone 10), often use the "remote support service", and intermediate and advanced users, who often deal with large amounts of data, such as videos, images, and music on the user apparatus often use the "cloud storage service". Also, advanced users, who are used to giving voice instruction, often use the "navigation service". Thus, there is sometimes a trend in the proficiency levels of the users that use each contract service. Also, the earlier a user's contract time is, that is, the longer a user has been using a service, the more advanced that user's operation of the user apparatus tends to be.

Also, users with a high proficiency level tend to enter contracts online, since entering a contract online requires more familiarity with the operation of the user apparatus and there are fewer restraints on the place and time compared to entering a contract at a store. Also, the more familiar with operating the user apparatus a user is and the higher that user's proficiency level is, the more likely that user is to perform contract changes suiting that user's usage status in order to sufficiently use the service. In view of this, in the above-described example, the proficiency level is determined according to these trends. In the present embodiment, by thus determining the proficiency level based on the service contract information, which is correlated with the proficiency level of operation of the user apparatus, it is possible to determine the user's proficiency level of operation of the user apparatus with higher accuracy compared to the case of determining the proficiency level without giving consideration to the service contract information.

Second Embodiment

A second embodiment of the present invention will be described below with a focus on differences from the first embodiment. In the first embodiment, the service contract information is used to determine the proficiency level, but in the second embodiment, information relating to billing in the case where a user uses a paid service is used.

Figures 11, 12, 13A:
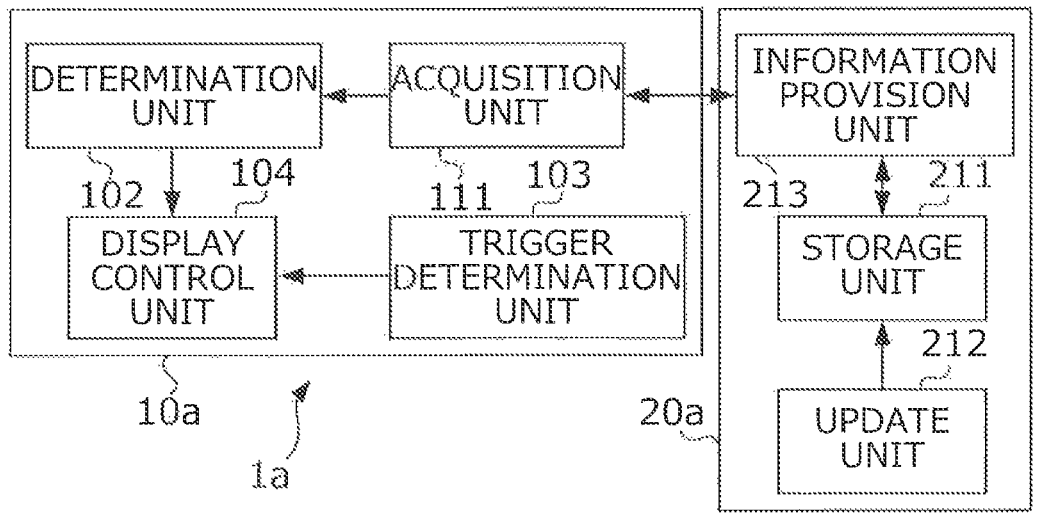
FIG. 11 is a diagram showing a functional configuration realized by an information processing system according to a second embodiment.
FIG. 12 is a diagram showing an example of stored billing information.
FIG. 13A is a diagram showing an example of a proficiency level score table.

FIG. 11 shows a functional configuration realized by information processing system 1a according to the second embodiment. Information processing system 1a includes smartphone 10a and server apparatus 20a. Smartphone 10a includes acquisition unit 111, determination unit 102, trigger determination unit 103, and display control unit 104. Server apparatus 20a includes storage unit 211, update unit 212, and information provision unit 213.

Storage unit 211 of server apparatus 20a stores service billing information, which is information relating to the billing of a paid service that is used by the user operating smartphone 10.

FIG. 12 shows an example of stored billing information. In the example of FIG. 12, storage unit 211 stores the billing date/time "2016.01.10 13:xx" and the billing amount "1500" (yen), the billing date/time "2016.02.20 19:xx" and the billing amount "2000" (yen), the billing date/time "2016.04.05 10:xx" and the billing amount "1000" (yen), and the like in association with the user ID "ID001".

Also, storage unit 211 stores the billing date/time "2016.01.15 20:xx" and the billing amount "300" (yen), the billing date/time "2016.01.15 21:xx" and the billing amount "500" (yen), the billing date/time "2016.01.15 23:xx" and the billing amount "400" (yen), and the like in association with the user ID "ID002".

Update unit 212 of server apparatus 20a updates the billing information stored in storage unit 211. For example, similarly to update unit 202 shown in FIG. 4, update unit 212 acquires the billing information from the service system that provides the paid service and updates the stored billing information.

Acquisition unit 111 of smartphone 10a acquires the billing information of the user using smartphone 10a. The billing information is an example of information indicating the user's usage status of the user apparatus (smartphone 10a in the present embodiment) of the present invention, and acquisition unit 111 is an example of an "acquisition unit" of the present invention. Similarly to acquisition unit 101 shown in FIG. 4, acquisition unit 111 acquires billing information by transmitting the request data to server apparatus 20a.

Information provision unit 213 of server apparatus 20a provides the billing information requested by the user apparatus to that user apparatus. Similarly to information provision unit 203 shown in FIG. 4, information provision unit 213 provides billing information to smartphone 10a, which is the user apparatus that transmitted the request data. Acquisition unit 111 acquires the billing information provided by information provision unit 213 and supplies the acquired billing information to determination unit 102.

Determination unit 102 of smartphone 10a determines the user's proficiency level of operation of the user apparatus based on the billing information acquired by acquisition unit 111. Determination unit 102 stores a proficiency level score table in which the billing information and the scores indicating the proficiency levels are associated, and a proficiency level table in which the proficiency level scores and the proficiency levels are associated, and determines the proficiency level based on these tables.

FIGS. 13A and 13B show examples of proficiency level score tables. In the example of FIG. 13A, the proficiency level scores "1", "3", and "5" are respectively associated with the billing unit prices "less than threshold Th11", "greater than or equal to threshold Th11, less than threshold Th12", and "greater than or equal to threshold Th12". In the example of FIG. 13B, the proficiency level scores "1", "3", and "5" are respectively associated with the billing frequency "less than threshold Th21", "greater than or equal to threshold Th21, less than threshold Th22", and "greater than or equal to threshold Th22".

The billing unit price is obtained by dividing the billing amounts included in the billing information acquired by acquisition unit 111 by the number of billing instances, and the billing frequency is obtained by calculating the average value of the number of billing instances in which the billing date/time is included in a unit period. Thus, acquisition unit 111 acquires billing information indicating the billing unit price of the paid service and the billing frequency of the paid service. Determination unit 102 calculates the billing unit price and the billing frequency of the user using smartphone 10a based on the billing information supplied by acquisition unit 111. Determination unit 102 adds up the proficiency level scores associated in the proficiency level score table with the calculated billing unit price and the billing frequency.

For example, it is assumed that the billing unit price calculated based on the billing information of the user of "ID001" shown in FIG. 12 is "1500" yen, which is greater than or equal to threshold Th11 and less than threshold Th12, and the billing frequency is "once per month", which is less than threshold Th21. In this case, determination unit 102 adds "3", which is associated with the billing unit price "greater than or equal to threshold Th11, less than threshold Th12", and "1", which is associated with the billing frequency "less than threshold Th21", to obtain "4", which is calculated as the score indicating the user's proficiency level.

Also, the billing unit price calculated based on the billing information of the user of "ID002" shown in FIG. 12 is "400" yen, which is less than threshold Th11, and the billing frequency is "50 times per month", which is greater than or equal to threshold Th22. In this case, determination unit 102 adds "1", which is associated with the billing unit price "less than threshold Th11", and "5", which is associated with the billing frequency "greater than or equal to threshold Th22", to obtain "6", which is calculated as the score indicating the proficiency level of the user.

FIG. 14 shows an example of a proficiency level table. In the example of FIG. 14, the proficiency levels "beginner", "intermediate", and "advanced" are respectively associated with the proficiency level scores "less than 3", "3 or more, less than 6", and "6 or more". Since "4" has been calculated as the score indicating the user proficiency level for the user of "ID001" described above for example, determination unit 102 determines "intermediate", which is associated with "3 or more, less than 6", as the user's proficiency level. Also, since "6" has been calculated as the score indicating the user proficiency level for the user of "ID002", determination unit 102 determines "advanced", which is associated with "6 or more", as the user's proficiency level.

In the present embodiment as well, similarly to the first embodiment, the proficiency level of operation is determined based on the billing information, which is an example of information indicating the usage status of the user apparatus, and therefore the results of analyzing the usage status of the user apparatus can be applied to the proficiency level determination processing. For example, the more proficient a user is at operating the user apparatus, the more enthusiastically that user will use the paid service, and therefore the higher the "billing unit price" and the "billing frequency" tend to be. In view of this, in the above-described example, the proficiency level is determined according to these trends. In the present embodiment, in this manner, by determining the proficiency level based on the billing information, which is correlated with the proficiency level of operation, it is possible to determine the proficiency level of operation with a higher accuracy compared to the case of determining the proficiency level without giving consideration to the billing information.

Third Embodiment

A third embodiment of the present invention will be described below with a focus on differences from the above-described embodiments. In the above-described embodiments, the service contract information or the billing information is used to determine the proficiency level, but in the third embodiment, information relating to a multi-function apparatus, such as a smartphone or a tablet terminal, which has been used by the user in the past, is used.

Note that in the present invention, if user apparatuses are divided into user apparatuses belonging to a first group (e.g., a mobile telephone that is operated using buttons) and user apparatuses belonging to a second group (e.g., a smartphone or tablet terminal that is operated using a touchscreen) that has more functions than the user apparatus belonging to the first group, a user apparatus belonging to the second group is called a multi-function apparatus. An operator operating an information processing system, for example, classifies the first group and the second group.

FIG. 15 shows a functional configuration realized by information processing system 1b according to the third embodiment. Information processing system 1b includes smartphone 10b and server apparatus 20b. Smartphone 10b includes acquisition unit 121, determination unit 102, trigger determination unit 103, and display control unit 104. Server apparatus 20b includes storage unit 221, update unit 222, and information provision unit 223.

Storage unit 221 of server apparatus 20b stores multi-function apparatus information, which is information relating to a multi-function apparatus that has been used by the user in the past.

FIG. 16 shows an example of the stored multi-function apparatus information. In the example of FIG. 16, storage unit 221 stores the used model "A Corp. Low 1", the storage capacity "16 GB", and the usage period "2014.01-2015.12", and the used model "B Corp. Mid 1", the storage capacity "32 GB", and the usage period "2016.01-" in association with the user ID "ID001".

Also, storage unit 221 stores the used model "A Corp. Mid 2", the storage capacity "64 GB", and the usage period "2012.04-2013.12", the used model "A Corp. High 1", the storage capacity "128 GB", and the usage period "2013.01-2015.12", the used model "C Corp. High 1", the storage capacity "256 GB", and the usage period "2015.09-", and the used model "A Corp. High 2", the storage capacity "128 GB", and the usage period "2016.01-" in association with the user ID "ID002".

Note that "Low", "Mid", and "High", which are included in the names of the models, indicate classifications of the level of performance (Low being the lowest and High being the highest) among multi-function apparatuses. The level of performance is indicated by, for example, the speed of the CPU, the size of the storage capacity, the speed of reading out data from the storage means, the communication speed, and the like (the performance is higher the faster the CPU is, the greater the storage capacity is, the faster data readout is, and the faster the communication speed is).

Update unit 222 of server apparatus 20b updates the multi-function apparatus information stored in storage unit 221. For example, similarly to update unit 202 shown in FIG. 4, update unit 222 acquires the multi-function apparatus information from a sales management system of a company that sells multi-function apparatuses, and update unit 222 updates the stored multi-function apparatus information.

Acquisition unit 121 of smartphone 10b acquires the multi-function apparatus information of the user using smartphone 10b. The multi-function apparatus information is an example of information indicating the user's usage status of the user apparatus (smartphone 10b in the present embodiment) of the present invention, and acquisition unit 121 is an example of an "acquisition unit" of the present invention. Similarly to acquisition unit 101 shown in FIG. 4, acquisition unit 121 acquires the multi-function apparatus information by transmitting request data to server apparatus 20b.

Information provision unit 223 of server apparatus 20b provides the multi-function apparatus information requested by the user apparatus to that user apparatus. Similarly to information provision unit 203 shown in FIG. 4, information provision unit 223 provides multi-function apparatus information to smartphone 10b, which is the user apparatus that transmitted the request data. Acquisition unit 121 acquires the multi-function apparatus information provided by information provision unit 223 and supplies the acquired multi-function apparatus information to determination unit 102.

Determination unit 102 of smartphone 10b determines the user's proficiency level of operation of the user apparatus based on the multi-function apparatus information acquired by acquisition unit 121. Determination unit 102 stores the proficiency level score table in which the multi-function apparatus information and the scores indicating the proficiency levels are associated, and a proficiency level table in which the scores of the proficiency levels and the proficiency levels are associated, and determines the proficiency level based on these tables.

FIGS. 17A to 17D show examples of proficiency level score tables. In the example of FIG. 17A, the proficiency level scores "1", "3", and "5" are respectively associated with the usage periods "less than 1 year", "1 year or more, less than 3 years", and "3 years or more". The usage period indicates the period in which the multi-function apparatus is used by the user in the past. In the example of FIG. 17B, the proficiency level scores "1", "3", and "5" are respectively associated with the simultaneously-used apparatus counts "1", "2", and "3 or more". The simultaneously-used apparatus count indicates the number of multi-function apparatuses used by the user, and in the present embodiment, the simultaneously-used apparatus count indicates the number of apparatuses currently being used simultaneously. Note that if multiple multi-function apparatuses have been used in the past, the number of apparatuses that have been used simultaneously in the past may be included.

In the example of FIG. 17C, the proficiency level scores "1", "3", and "5" are respectively associated with the apparatus performances (storage capacities) "less than 32 GB", "32 GB or more, less than 128 GB", "128 GB or more". In the example of FIG. 17D, the proficiency level scores "1", "3", and "5" are respectively associated with the apparatus models "low end", "middle range", and "high end". In the present embodiment, the performance of the multi-function apparatus (usually a smartphone) that is currently mainly used by the user is indicated as the apparatus performance, and the model is indicated as the apparatus model.

The above-described usage period is obtained by adding up the usage periods included in the multi-function apparatus information acquired by acquisition unit 121 and excluding overlapping periods. Also, the number of multi-function apparatuses for which the usage period has not ended indicates the current simultaneously-used apparatus count. In this manner, acquisition unit 121 acquires information indicating the above-described usage period, simultaneously-used apparatus count, apparatus performance, and apparatus model as the multi-function apparatus information.

Determination unit 102 adds up the proficiency level scores associated in the proficiency level score table with the usage period, simultaneously-used apparatus count, apparatus performance, and apparatus model indicated by the multi-function apparatus information supplied from acquisition unit 121. For example, in the case of the user of "ID001" shown in FIG. 16, determination unit 102 adds up "3", which is associated with the usage period "1 year or more, less than 3 years", "1", which is associated with the simultaneously-used apparatus count "1", "3", which is associated with the apparatus performance "32 GB or more, less than 128 GB", and "3", which is associated with the apparatus model "middle range", to obtain "10", which is calculated as the score indicating the user's proficiency level.

Also, in the case of the user of "ID002" indicated in FIG. 16, determination unit 102 adds up "5", which is associated with the usage period "3 years or more", "3", which is associated with the simultaneously-used apparatus count "2", "5", which is associated with the apparatus performance "128 GB or more", and "5", which is associated with the apparatus model "high end", to obtain "18", which is calculated as the score indicating the user's proficiency level.

FIG. 18 shows an example of a proficiency level table. In the example of FIG. 18, the proficiency levels "beginner", "intermediate", and "advanced" are respectively associated with the proficiency level scores "less than 10", "10 or more, less than 15", and "15 or more". Since "10" has been calculated as the score indicating the user proficiency level for the user of "ID001" described above for example, determination unit 102 determines "intermediate", which is associated with "10 or more, less than 15", as the user's proficiency level. Also, since "18" has been calculated as the score indicating the user proficiency level for the user of "ID002", determination unit 102 determines "advanced", which is associated with "15 or more", as the user's proficiency level.

In the present embodiment as well, similarly to the first embodiment, the proficiency level of operation is determined based on information relating to the multi-function apparatus, which is an example of information indicating the usage status of the user apparatus, and therefore the results of analyzing the usage status of the user apparatus can be applied to the proficiency level determination processing. For example, the longer a user uses the multi-function apparatus, the more experience that user has operating the user apparatus, and therefore the higher the proficiency level tends to be. Also, the higher the user's proficiency level is, the number of simultaneously-used apparatuses tends to be greater, the apparatus performance tends to be higher, and the apparatus model tends to be closer to being high end.

In view of this, in the above-described example, the proficiency level is determined according to these trends. In the present embodiment, in this manner, by determining the proficiency level based on the multi-function apparatus information (information including the usage period, the simultaneously-used apparatus count, the apparatus performance, and the apparatus model), which is correlated with the proficiency level of operation, it is possible to determine the proficiency level of operation with a higher accuracy compared to the case of determining the proficiency level without giving consideration to the multi-function apparatus information.

Modified Examples

The above-described embodiments are merely examples of implementing the present invention, and may be modified as described below. Also, the embodiments and modified examples may be implemented in combination, as needed.

Response to a Hint

Information indicating the usage status that is different from that in the above-described embodiment may be used to determine the proficiency level. For example, a history of operations performed by the user may be used when a hint is displayed.

FIG. 19 shows a functional configuration realized by smartphone 10c according to the present modified example. Smartphone 10c includes determination unit 102, trigger determination unit 103, display control unit 104, storage control unit 131, storage unit 132, and acquisition unit 133. When a hint is displayed, display control unit 104 supplies the displayed hint to storage control unit 131. If there are multiple character strings and images indicating a hint, display control unit 104 supplies them to storage control unit 131 each time display is performed.

If an operation is performed by the user when a hint is displayed by display control unit 104, storage control unit 131 stores the operation history in storage unit 132. When a hint is supplied from display control unit 104, for example, storage control unit 131 stores the operation history up to when a predetermined period has elapsed thereafter. As the predetermined period, for example, a period of a length according to which a user is expected to be able to perform an operation based on the displayed hint is used. Storage control unit 131 thus stores the operation history in storage unit 132, and stores the hint that is displayed when the operations indicated by the operation history are performed, in storage unit 132.

Storage unit 132 stores the operation history and the hint stored by storage control unit 131.

FIG. 20 shows an example of the stored operation history and hint. In the example of FIG. 20, storage unit 132 stores the operation contents "operation of selecting item E", "operation of setting parameter F", . . . , and "operation of completing initial setting", the operation times "19:00", "19:02", . . . , and "20:00", and a hint with the title "operation procedure for initial setting of application D" in association with each other. Although only the title of the hint is shown in FIG. 20, storage unit 132 actually stores the content of a series of hints that are displayed as indicating the operation procedure for initial settings of application D.

Acquisition unit 133 acquires the operation history stored in storage unit 132, that is, the history of operations performed by the user while the hint is displayed by display control unit 104. The operation history is an example of information indicating the usage status of the user apparatus (smartphone 10c in the present modified example) of the user in the present invention, and acquisition unit 133 is an example of an "acquisition unit" of the present invention. Acquisition unit 133 acquires the operation history and the hint stored in association with the operation history, and supplies the operation history and the hint to determination unit 102.

Determination unit 102 determines the user's proficiency level of operation of the user apparatus based on the operation history acquired by acquisition unit 133. For this determination, determination unit 102 calculates the degree of matching between the operation content indicated by the operation history and the operation content indicated by the hint, and the operation time that is needed for the operation indicated by the operation history. Determination unit 102 stores a proficiency level score table in which the degrees of matching and operation times of the operation content, and scores indicating the proficiency level are associated, and a proficiency level table in which the proficiency level scores and the proficiency levels are associated, and determination unit 102 determines the proficiency level using these tables.

FIGS. 21A and 21B show examples of proficiency level score tables. In the example of FIG. 21A, the proficiency level scores "1", "3", and "5" are respectively associated with the operation content matching degrees "less than 70%", "70% or more, less than 90%", and "90% or more". In the example of FIG. 21B, the proficiency level scores "5", "3", and "1" are respectively associated with the operation times "standard time×less than 0.5", "standard time×0.5 or more, standard time×less than 1.5", and "standard time×1.5 or more".

Determination unit 102 adds up the proficiency level scores associated in the proficiency level score table with the matching degrees and operation times of the operation content calculated based on the operation history supplied from acquisition unit 133. For example, if the operation history shown in FIG. 20 is acquired, the matching degree of the operation content is 85%, the operation time is calculated as 1 hour, and the standard time for "method for initial setting of application D" is 30 minutes, determination unit 102 adds "3", which is associated with the operation content matching degree "70% or more, less than 90%", and "1", which is associated with the operation time "standard time× 1.5 or more" (standard time 30 minutes×1.5=45 minutes <calculated operation time of 1 hour), to obtain "4", which is calculated as the score indicating the proficiency level of the user.

FIG. 22 shows an example of a proficiency level table. In the example of FIG. 22, the proficiency levels "beginner", "intermediate", and "advanced" are respectively associated with the proficiency level scores "less than 5", "5 or more, less than 8", and "8 or more". Since "4" is calculated as the score indicating the user proficiency level in the case where the operation history shown in FIG. 20 is acquired, for example, determination unit 102 determines "beginner", which is associated with "less than 5", as the user's proficiency level.

The higher the proficiency level of the user is, the shorter the amount of time in which the user can perform the operation as indicated by the hint is, and therefore the higher the matching degree of the operation content tends to be and the shorter the operation time tends to be. In the present embodiment, by determining the proficiency level based on the information indicating the usage status of the user apparatus (operation history obtained when the hint is displayed), which is correlated with the proficiency level of operation, it is possible to determine the proficiency level of operation with a higher accuracy compared to the case of determining the proficiency level without giving consideration to this information.

Specific Response to a Hint

In the above-described example, when a correct and rapid operation is performed in accordance with the display hint, it is determined that the proficiency level is high. However, if a simple hint is displayed, an advanced user sometimes does not perform an operation in accordance with the hint, since the advanced user does not need to look at the hint. In view of this, in the present modified example, determination unit 102 determines the proficiency level based on information indicating which hint the user referenced.

FIG. 23 shows a functional configuration realized by smartphone 10d according to the present modified example. Smartphone 10d includes acquisition unit 134 instead of acquisition unit 133 shown in FIG. 19. Display control unit 104 displays multiple hints. Acquisition unit 134 acquires hint specification information indicating the hint according to which the user performed a specific operation when displayed, among the multiple hints displayed by display control unit 104.

This hint specific information is an example of information indicating the usage status of the user apparatus (smartphone 10*d* in the present embodiment) of the user of the present invention, and acquisition unit 134 is an example of an "acquisition unit" of the present invention. A specific operation is, for example, an operation for displaying a continuation of a hint.

FIG. 24 shows an example of a specific operation. In the example of FIG. 24, display control unit 104 displays hint H3, which includes the character strings "hint" and "The operation procedure for initial setting of application D is as follows.", operator image B1, which says "To the next page", and operator image B2, which says "Close", on touchscreen 16 of smartphone 10*d*.

An operation of pressing operator image B1 is an example of an operation for displaying a continuation of a hint. Other than this, an operation of moving a scroll bar to display a portion of the hint that is not displayed is another operation for displaying a continuation of a hint. For example, acquisition unit 134 acquires the name of the hint stored in storage unit 132 in association with the operation history including the operation contents, as the above-described hint specification information. Acquisition unit 134 supplies the thus-acquired hint specification information to determination unit 102.

Determination unit 102 determines the user's proficiency level of operation of the user apparatus based on the hint specification information acquired by acquisition unit 134. Determination unit 102 stores a proficiency level score table in which the types of hints specified by the hint specification information and the scores indicating the proficiency level are associated, and a proficiency level table in which the proficiency level scores and the proficiency levels are associated, and determination unit 102 determines the proficiency level using these tables.

FIG. 25 is an example of a proficiency level score table. In the example of FIG. 25, the proficiency level score "1" is associated with the hint type "explanation of initial settings and standard functions". Similarly, the proficiency level scores "3" and "5" are respectively associated with the hint types "explanation of additional function" and "explanation of customization method". Determination unit 102 adds up the proficiency level scores associated in the proficiency level score table with hint types specified according to the hint specification information supplied from acquisition unit 134.

For example, if hint H3 shown in FIG. 24 is specified, determination unit 102 calculates "1", which is associated with the hint type "explanation of initial settings and standard functions", as the score indicating the proficiency level. If there are multiple hints specified by the hint specification information, determination unit 102 adds up the proficiency level scores associated with the hint types. Thereafter, similarly to the above-described examples, determination unit 102 determines the user's proficiency level using the proficiency level table.

The types of hints that are referenced tend to differ depending on how high the proficiency level is. For example, simple hints are helpful to a beginner, and difficult hints are helpful to an advanced user. In the present embodiment, by determining the proficiency level based on the information indicating the usage status (information specifying the hint displayed when the user performs a specific operation), which is correlated with the proficiency level of operation, it is possible to determine the proficiency level of operation with a higher accuracy compared to the case of determining the proficiency level without giving consideration to this information.

Contract Time

In an embodiment, the earlier the contract time of the service contract is, that is, the longer the period that has elapsed since entering the contract, the higher the proficiency level score is, but there is no limitation to this.

FIG. 26 is an example of a proficiency level score table of the present modified example. In the example of FIG. 26, the proficiency level scores "0" and "2" are respectively associated with the contract times "one month from the start of sale of the user apparatus" and "other".

In the early stages of selling the user apparatus, promotions are sometimes offered, such as providing various services free of charge for a certain period or at a discount and having the user renew if the user is satisfied with the services. For this reason, in this time, although more service contracts are entered compared to other times, those services are not likely to be used. In view of this, in the example of FIG. 26, by reducing the score of the proficiency level for the service contract entered in the early stages of selling the user apparatus, it is possible to determine the proficiency level with a higher accuracy compared to the case of using the score determined without giving consideration to whether or not the service contract is entered in the early stages of selling.

Determination Using the Operation History

Determination unit 102 may also determine the proficiency level with consideration given to the operation history (not limited to the above-described operation history during hint display) of the user apparatus, for example, instead of the above-described information indicating the usage state. In this case, for example, scores are provided for all of the operations a user can perform, such that a higher score is provided the more difficult the operation is. Determination unit 102 determines the proficiency level by adding the average value of the scores provided for the operations performed by the user in a certain period to the proficiency level scores calculated based on the information indicating the usage status. Note that the method of determining the proficiency level based on the operation history is not limited to that described here, and another known technique may be used.

Method of Indicating Proficiency Level

Although the proficiency levels are indicated as beginner, intermediate, and advanced in the above-described examples, there is no limitation to this. For example, proficiency levels lower than beginner and higher than advanced may also be indicated, and these may be indicated by levels (LV1, LV2, . . . ). Also, the proficiency level scores may be used as-is as the proficiency levels (the proficiency level being higher the greater the score is). In this case, although a higher proficiency level is indicated the larger the proficiency level scores are in the above-described embodiment, conversely, it is also possible to use a deduction method on the proficiency level scores and to indicate a higher proficiency level the smaller the score is. In this case, determination unit 102 determines a higher proficiency level the smaller the total proficiency level score is. In any case, the proficiency level may be indicated in any manner, as long as a hint that is suitable according to the proficiency level can be displayed.

Apparatus for Realizing Functions

The functions shown in FIG. 4 and the like may be realized by an apparatus different from that in the embodiment.

FIGS. 27A and 27B show examples of functional configurations of the present modified example. In the example of FIG. 27A, smartphone 10e is shown, which includes storage unit 201 and update unit 202 included in server apparatus 20, in addition to the units included in smartphone 10 in FIG. 4. In this case, even if server apparatus 20 is not present, smartphone 10e can determine the proficiency level of operation based on the service contract information.

In the example of FIG. 27B, information processing system 1f is shown, which includes smartphone 10f including trigger determination unit 103 and display control unit 104 shown in FIG. 4, and server apparatus 20f including storage unit 201, update unit 202, acquisition unit 101, and determination unit 102 shown in FIG. 4. In this case, server apparatus 20f determines the user's proficiency level of operation using smartphone 10f, and smartphone 10f displays a hint based on the determination result. Server apparatus 20f in this case is an example of a "determination apparatus" of the present invention.

User Apparatus

The user apparatus is not limited to the above-described smartphone, and may be a mobile telephone, a tablet terminal, a laptop personal computer, a desktop personal computer, or the like. In short, the user apparatus may be anything, as long as it is an apparatus operated by a user.

Method for Utilizing Proficiency Level

Although the determined proficiency level is utilized for hint display in the above-described examples, there is no limitation to this. For example, items displayed on a menu screen may be selected according to the proficiency level (the number of items relating to screen or function customization increases the higher the proficiency level is, or the like). Also, it is possible to make it easier for the user to operate by increasing the sizes of icons and characters the lower the proficiency level is. In short, the proficiency level may be used in any kind of application, as long as user-friendliness improves by changing the operation of the user apparatus according to the proficiency level of operation of the user apparatus.

Category of Invention

Other than a determination apparatus such as a CPU of a smartphone or a server apparatus, the present invention is also understood as a determination system (the information processing system described in the examples above being an example thereof) including such determination apparatuses. Also, the present invention is understood also as a determination method for achieving processing implemented by the apparatuses, and is understood also as a program for causing a computer for controlling the apparatuses to function. This program may also be provided in the form of a recording medium such as an optical disk storing the program, and may be provided in a form that can be downloaded to a computer via a network such as the Internet, installed, and used, or the like.

REFERENCE SIGNS LIST

1 Information processing system
2 Network
10 Smartphone
20 Server apparatus
16 Touchscreen
101 Acquisition unit
102 Determination unit
103 Trigger determination unit
104 Display control unit
111 Acquisition unit
121 Acquisition unit
131 Storage control unit
132 Storage unit
133 Acquisition unit
134 Acquisition unit
201 Storage unit
202 Update unit
203 Information provision unit
211 Storage unit
212 Update unit
213 Information provision unit
221 Storage unit
222 Update unit
223 Information provision unit

What is claimed is:

1. A determination apparatus comprising:
an acquisition unit configured to acquire service contract information relating to a contract for a service used by operation of an apparatus;
a determination unit configured to determine a proficiency level of operation of the apparatus used by a user based on the acquired service contract information; and
a display control unit configured to display a hint in the operation of the apparatus based on the proficiency level of operation of the apparatus.

2. The determination apparatus according to claim 1, wherein
the service contract information includes at least one of a time at which the service is contracted, a method for entering the contract for the service, and information indicating whether or not content of the service has been changed.

3. The determination apparatus according to claim 1, wherein
the service contract information relates to billing of a paid service used by the operation of the user apparatus.

4. The determination apparatus according to claim 3, wherein
the service contract information relates to a billing unit price for the paid service or a billing frequency for the paid service.

5. The determination apparatus according to claim 1, wherein
the apparatus includes a first apparatus belonging to a first group, and a second apparatus belonging to a second group that has more functions than the first apparatus belonging to the first group,
the acquisition unit acquires apparatus information relating to characteristics of the second apparatus that has been used by the user; and
the determination unit configured to determine a proficiency level of operation of the apparatus used by a user based on the acquired apparatus information.

6. The determination apparatus according to claim 5, wherein
the apparatus information includes a period in which the user has used the second user apparatus in the past, a number of the second user apparatus that is used by the user, a performance of the second user apparatus that is used by the user, or a model of the second user apparatus that is used by the user.

7. The determination apparatus according to claim 1, wherein
- the user apparatus has a function of displaying usage method information indicating a method of using the user apparatus, and
- the acquisition unit acquires historical information including a history of operations performed by the user while the usage method information is displayed, and
- the determination unit configured to determine a proficiency level of operation of the apparatus used by a user based on the acquired historical information.

8. The determination apparatus according to claim 1, wherein
- the apparatus has a function of displaying multiple pieces of usage method information indicating methods of using the user apparatus, and
- from among the multiple pieces of usage method information, the acquisition unit acquires information specifying usage method information displayed when the user performs a specific operation; and
- the determination unit configured to determine a proficiency level of operation of the apparatus used by a user based on the acquired information specifying usage method information displayed.

9. The determination apparatus according to claim 1, wherein the determination unit is further configured to determine a proficiency level from among proficiency levels, the number of the proficiency levels being identical with a number of hints prepared for a corresponding trigger.

10. The determination apparatus according to claim 1, wherein the determination unit is further configured to calculate a sum of a first score regarding a time at which a service is contracted, a second score regarding a method for entering a contract for the service, and a third score regarding information indicating whether or not the content of the service has been changed, and determines a proficiency level according to the sum of the first, second and third scores.

11. A determination system comprising:
- an acquisition unit configured to acquire service contract information relating to a contract for a service used by operation of an apparatus;
- a determination unit configured to determine a proficiency level of operation of the apparatus used by a user based on the acquired service contract information; and
- a display control unit configured to display a hint in the operation of the apparatus based on the proficiency level of operation of the apparatus.

* * * * *